(12) United States Patent
Yumiki et al.

(10) Patent No.: US 7,463,824 B2
(45) Date of Patent: Dec. 9, 2008

(54) COLLAPSIBLE LENS BARREL

(75) Inventors: Naoto Yumiki, Hirakata (JP); Yutaka Takahashi, Hirakata (JP)

(73) Assignee: Panasonic Corporation, Osaka (JP)

( * ) Notice: Subject to any disclaimer, the term of this patent is extended or adjusted under 35 U.S.C. 154(b) by 286 days.

(21) Appl. No.: 10/550,836

(22) PCT Filed: Aug. 30, 2004

(86) PCT No.: PCT/JP2004/012890

§ 371 (c)(1),
(2), (4) Date: Sep. 23, 2005

(87) PCT Pub. No.: WO2005/040887

PCT Pub. Date: Jun. 5, 2005

(65) Prior Publication Data

US 2006/0182432 A1    Aug. 17, 2006

(30) Foreign Application Priority Data

Oct. 22, 2003  (JP)  ............................. 2003-362582

(51) Int. Cl.
*G03B 17/00* (2006.01)
(52) U.S. Cl. .................. 396/72; 396/344; 396/349; 359/699; 359/700; 359/701; 359/823
(58) Field of Classification Search .................. 396/344, 396/349, 72; 359/699, 700, 701, 823
See application file for complete search history.

(56) References Cited

U.S. PATENT DOCUMENTS

| 5,765,048 A | * | 6/1998 | Nomura et al. | ................ 396/72 |
| 6,606,206 B2 | * | 8/2003 | Takeshita et al. | ............ 359/704 |
| 6,714,359 B2 | * | 3/2004 | Kobayashi | .................. 359/700 |
| 2002/0044363 A1 | | 4/2002 | Takeshita et al. | |

FOREIGN PATENT DOCUMENTS

| JP | 2001-182722 | * | 6/2001 |
| JP | 2002-90611 | | 3/2002 |

* cited by examiner

*Primary Examiner*—W. B. Perkey
*Assistant Examiner*—Michael A Strieb
(74) *Attorney, Agent, or Firm*—Hamre, Schumann, Mueller & Larson, P.C.

(57) ABSTRACT

A cam pin (16) and a demating prevention pin (35) that are provided in a driving frame (15) and have an identical shape are allowed to mate with a cam groove (18) and a demating prevention groove (36) that are provided in a cam frame (17), respectively. A first protrusion (37) is provided on at least one side in an optical axis direction of a portion of the demating prevention groove (36) with which the demating prevention pin (35) mates when the driving frame (15) is advanced. When an external force is applied to the driving frame (15), a cylindrical portion (35*f*) of the demating prevention pin (35) and the first protrusion (37) come into contact with each other. This prevents the cam pin (16) from demating from the cam groove (18). The cam pin (16) and the demating prevention pin (35) are made of common components, making it possible to reduce the number of components.

4 Claims, 13 Drawing Sheets

COLLAPSIBLE LENS BARREL

TECHNICAL FIELD

The present invention relates to a collapsible lens barrel ready for a high zooming factor. In particular, the present invention relates to a collapsible lens barrel capable of improving a zoom operation, miniaturizing a lens barrel and reducing an entire length of the lens barrel while maintaining its optical performance.

BACKGROUND ART

In recent years, the use of a digital still camera (in the following, referred to as DSC) allowing a user to check a captured image immediately has been expanding rapidly. As a lens barrel for this DSC, a so-called collapsible lens barrel, which can be made shorter when not in use, generally is adopted in view of its portability when not in use.

The collapsible lens barrel generally includes a collapsing mechanism in which a cam pin is allowed to mate with a cam groove so as to drive a lens frame and a lens group. In such a collapsing mechanism, when an external force is applied, the demating of the cam pin from the cam groove has to be prevented as it makes a camera main body unworkable. For example, JP 2002-90611 A discloses a mechanism for preventing a cam pin from demating from a cam groove as described in the following. That is, an outer peripheral surface of a cam ring is provided with a cam groove and a demating prevention groove extending along this cam groove, and an inner peripheral surface of a first lens frame is provided with a tapered cam follower and a cylindrical roller member that are inserted into the cam groove and the demating prevention groove, respectively. In this way, wall surfaces of the demating prevention groove facing each other and the roller member come into contact with each other when an external force is applied, making it possible to prevent the tapered cam follower sliding in the cam groove from demating from the cam groove.

However, in the conventional collapsible lens barrel described above, since the tapered cam follower sliding in the cam groove and the roller member moving inside the demating prevention groove have different shapes, two kinds of components are needed as the cam pins. Accordingly, the number of components increases, and the management thereof is complicated. Moreover, although these components are both small and have a slight difference in shape, there is a problem of complicated assembly. For example, the cam ring and the first lens frame cannot be assembled if these components are attached reversely at the time of the attachment to the first lens frame.

DISCLOSURE OF INVENTION

It is an object of the present invention to provide a collapsible lens barrel that is easy to assemble owing to a small number of components and includes a mechanism for preventing a cam pin from demating reliably when an external force is applied.

A first collapsible lens barrel according to the present invention is a collapsible lens barrel, whose lens group is advanced when an image is captured, including a driving frame for driving the lens group, including a cam pin and a demating prevention pin that have an identical shape including a cylindrical portion and a tapered portion at its tip, a cam frame including a cam groove and a demating prevention groove that mate with the cam pin and the demating prevention pin, respectively, and a first protrusion provided on at least one side in an optical axis direction of a portion of the demating prevention groove with which the demating prevention pin mates when the driving frame is advanced. In a state where the lens group has been advanced, the cylindrical portion of the demating prevention pin may contact the first protrusion to prevent the cam pin from demating from the cam groove.

A second collapsible lens barrel according to the present invention is a collapsible lens barrel, whose lens group is retracted when an image is not captured, including a driving frame for driving the lens group, including a cam pin and a demating prevention pin that have an identical shape including a cylindrical portion and a tapered portion at its tip, a cam frame including a cam groove and a demating prevention groove that mate with the cam pin and the demating prevention pin, respectively, and a second protrusion provided on at least one side in an optical axis direction of a portion of the demating prevention groove with which the demating prevention pin mates when the driving frame is retracted. In a state where the lens group has been retracted, the cylindrical portion of the demating prevention pin may contact the second protrusion to prevent the cam pin from demating from the cam groove.

A third collapsible lens barrel according to the present invention is a collapsible lens barrel, whose lens group is advanced when an image is captured and whose lens group is retracted when the image is not captured, including a driving frame for driving the lens group, including a cam pin and a demating prevention pin that have an identical shape including a cylindrical portion and a tapered portion at its tip, a cam frame including a cam groove and a demating prevention groove that mate with the cam pin and the demating prevention pin, respectively, a first protrusion provided on at least one side in an optical axis direction of a portion of the demating prevention groove with which the demating prevention pin mates when the driving frame is advanced, and a second protrusion provided on at least one side in the optical axis direction of a portion of the demating prevention groove with which the demating prevention pin mates when the driving frame is retracted. In a state where the lens group has been advanced, the cylindrical portion of the demating prevention pin may contact the first protrusion to prevent the cam pin from demating from the cam groove, and in a state where the lens group has been retracted, the cylindrical portion of the demating prevention pin may contact the second protrusion to prevent the cam pin from demating from the cam groove.

A fourth collapsible lens barrel according to the present invention is a collapsible lens barrel, whose lens group is advanced when an image is captured, including a driving frame for driving the lens group, including a cam pin including a cylindrical portion and a tapered portion at its tip, a cam frame including a cam groove that mates with the cam pin, and a first protrusion provided on at least one side in an optical axis direction of a portion of the cam groove with which the cam pin mates when the driving frame is advanced. In a state where the lens group has been advanced, the cylindrical portion of the cam pin may contact the first protrusion to prevent the cam pin from demating from the cam groove.

A fifth collapsible lens barrel according to the present invention is a collapsible lens barrel, whose lens group is retracted when an image is not captured, including a driving frame for driving the lens group, including a cam pin including a cylindrical portion and a tapered portion at its tip, a cam frame including a cam groove that mates with the cam pin, and a second protrusion provided on at least one side in an optical axis direction of a portion of the cam groove with which the cam pin mates when the driving frame is retracted. In a state where the lens group has been retracted, the cylindrical portion of the cam pin may contact the second protrusion to prevent the cam pin from demating from the cam groove.

A sixth collapsible lens barrel according to the present invention is a collapsible lens barrel, whose lens group is advanced when an image is captured and whose lens group is retracted when the image is not captured, including a driving frame for driving the lens group, including a cam pin including a cylindrical portion and a tapered portion at its tip, a cam frame including a cam groove that mates with the cam pin, a first protrusion provided on at least one side in an optical axis direction of a portion of the cam groove with which the cam pin mates when the driving frame is advanced, and a second protrusion provided on at least one side in the optical axis direction of a portion of the cam groove with which the cam pin mates when the driving frame is retracted. In a state where the lens group has been advanced, the cylindrical portion of the cam pin may contact the first protrusion to prevent the cam pin from demating from the cam groove, and in a state where the lens group has been retracted, the cylindrical portion of the cam pin may contact the second protrusion to prevent the cam pin from demating from the cam groove.

DESCRIPTION OF THE INVENTION

In accordance with the first to sixth collapsible lens barrels according to the present invention, it is possible to prevent reliably the cam pin from demating from the cam groove when an external force is applied, while reducing the number of components.

In particular, the first and fourth collapsible lens barrels described above have excellent durability against dropping and an external force to be applied and reliability when the camera is in use, the second and fifth collapsible lens barrels described above have the same when the camera is not in use, and the third and sixth collapsible lens barrels described above have the same when the camera is both in use and not in use.

Also, in the first to third collapsible lens barrels described above, since the cam pin for driving a moving frame and the demating prevention pin for preventing the cam pin from demating from the cam groove can be made of common components, it is possible to reduce the number of components and avoid the complication of assembling processes.

Further, in the fourth to sixth collapsible lens barrels described above, since there is no need for a demating prevention pin or a demating prevention groove for preventing a cam pin from demating from a cam groove, it becomes possible to reduce the number of components and assembling processes.

In the following, the collapsible lens barrel according to the present invention will be described referring to FIGS. 1 to 13.

Figure 1:
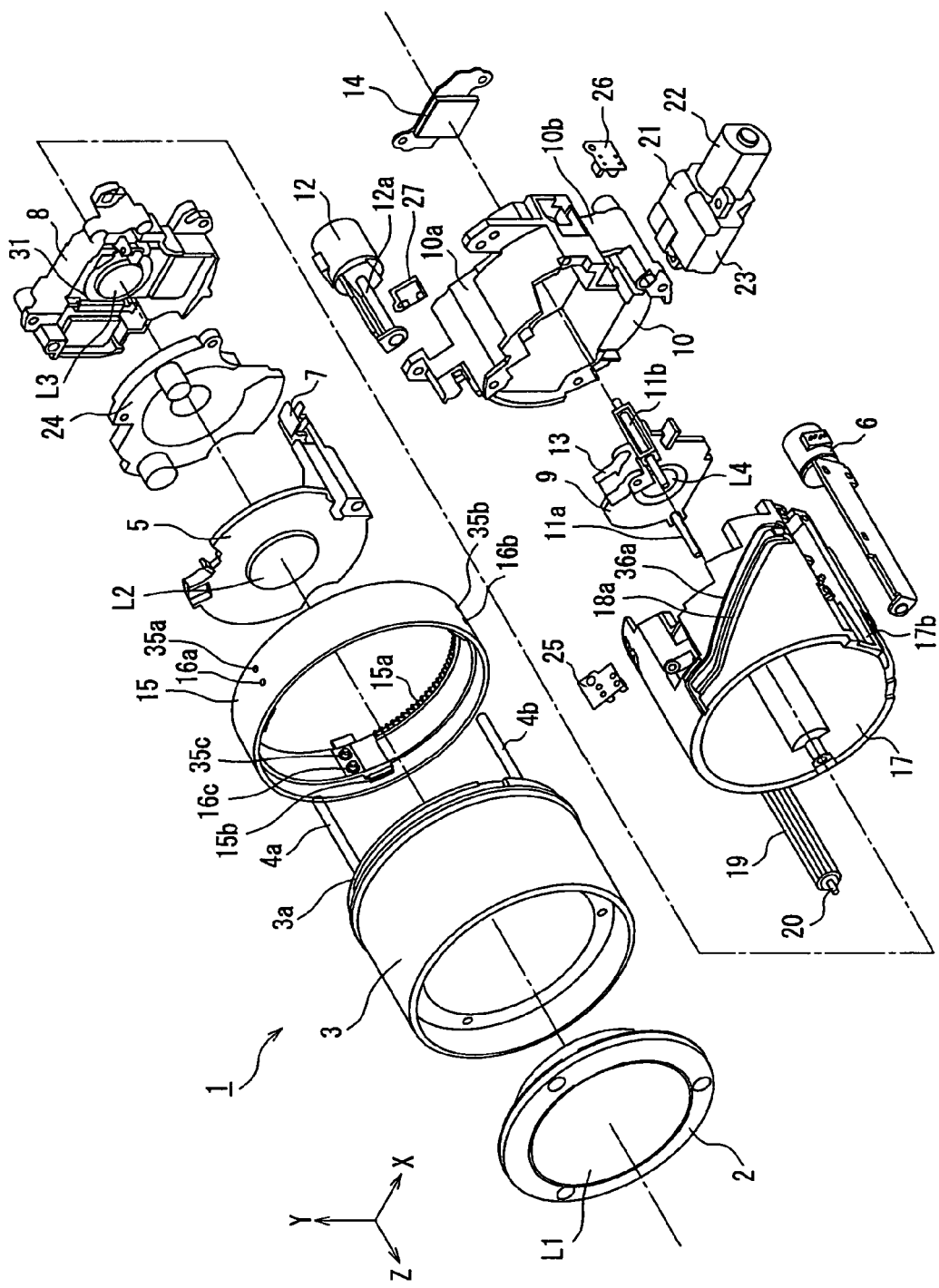
FIG. 1 is an exploded perspective view showing a collapsible lens barrel according to an embodiment of the present invention.
Figure 2:
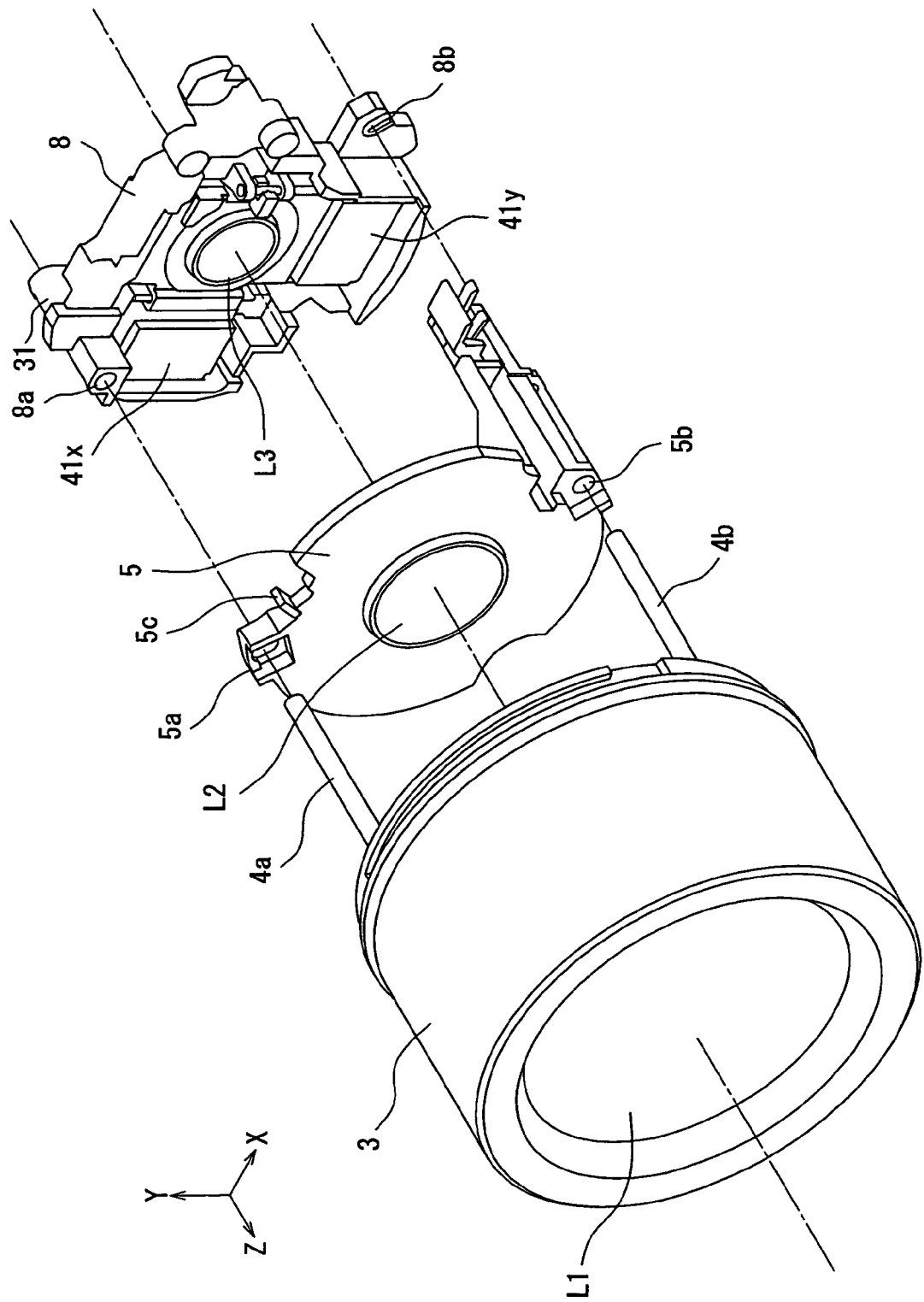
FIG. 2 is an exploded perspective view for describing guide pole supporting portions in the collapsible lens barrel according to the embodiment of the present invention.
Figure 3A:
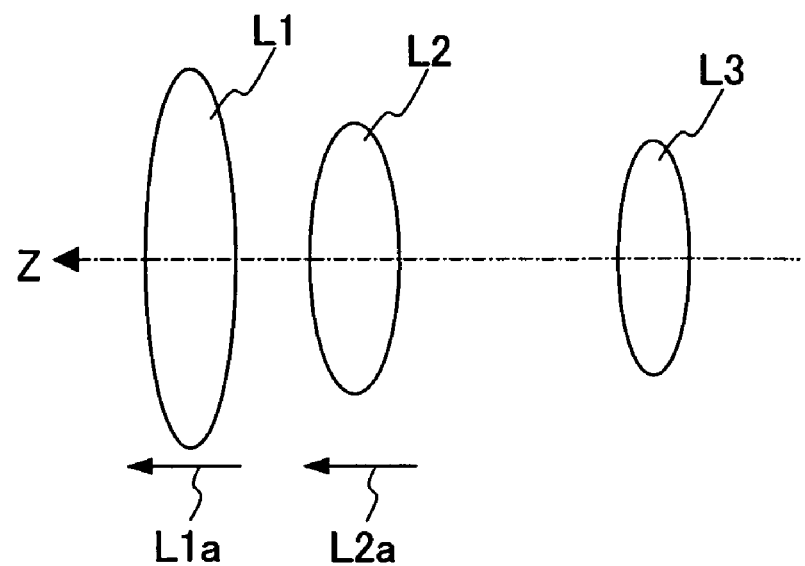
FIG. 3A shows how lenses tilt in an ideal collapsible lens barrel.
Figure 3B:
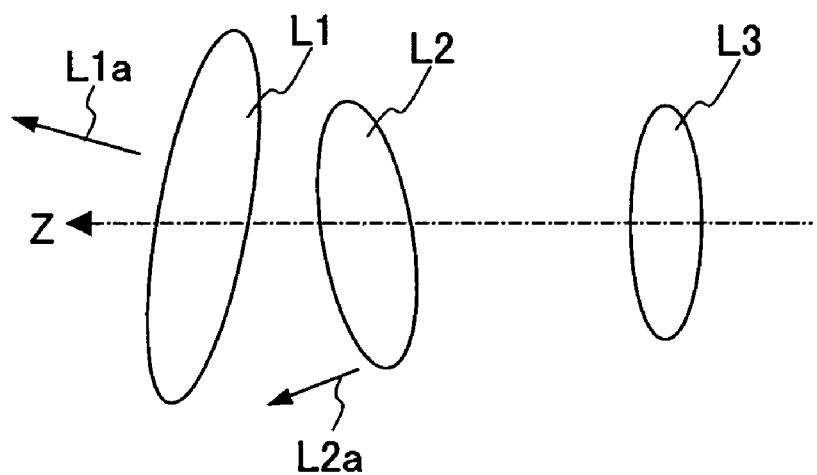
FIG. 3B shows how the lenses tilt in a conventional collapsible lens barrel.
Figure 3C:
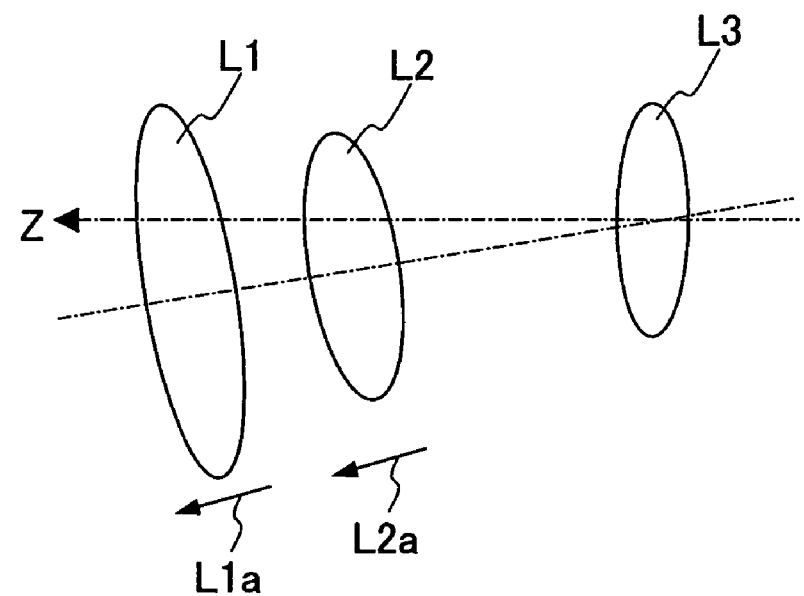
FIG. 3C shows how the lenses tilt in the collapsible lens barrel according to the embodiment of the present invention.
Figure 4:
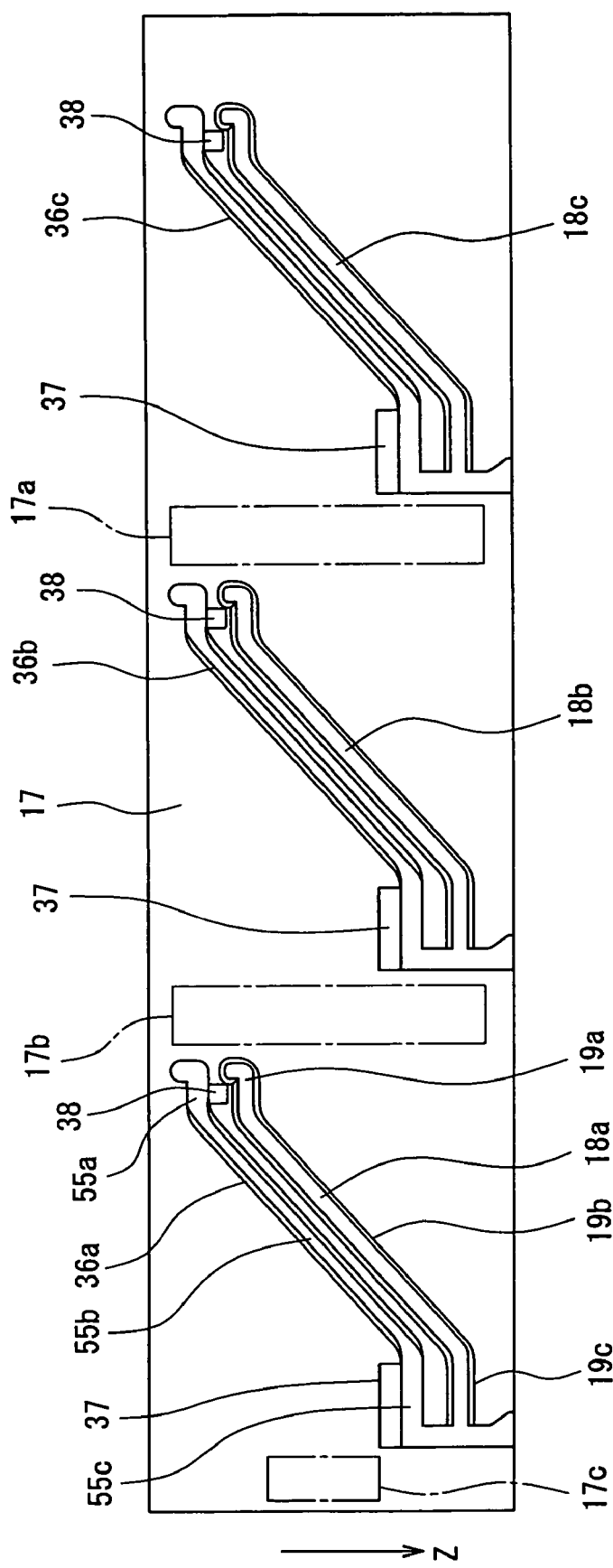
FIG. 4 is a developmental view of cam grooves in the collapsible lens barrel according to the embodiment of the present invention.
Figure 5A:
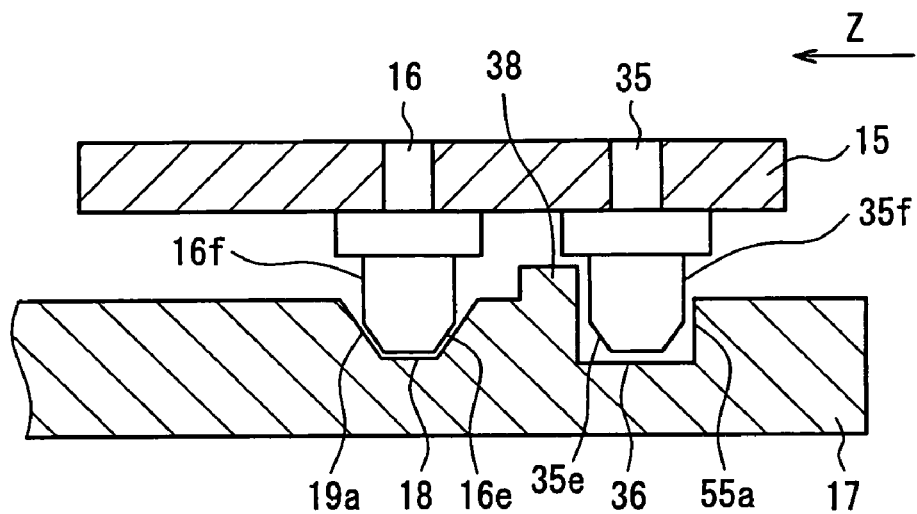
FIG. 5A is a sectional view showing a relationship between the cam groove and a cam pin when retracting the collapsible lens barrel in the embodiment of the present invention.
Figure 5B:
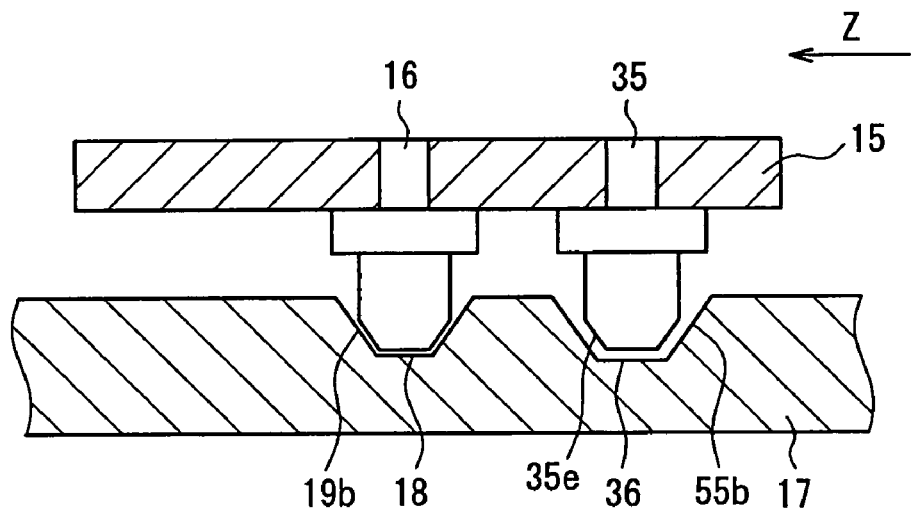
FIG. 5B is a sectional view showing the relationship between the cam groove and the cam pin when driving the barrel.
Figure 5C:
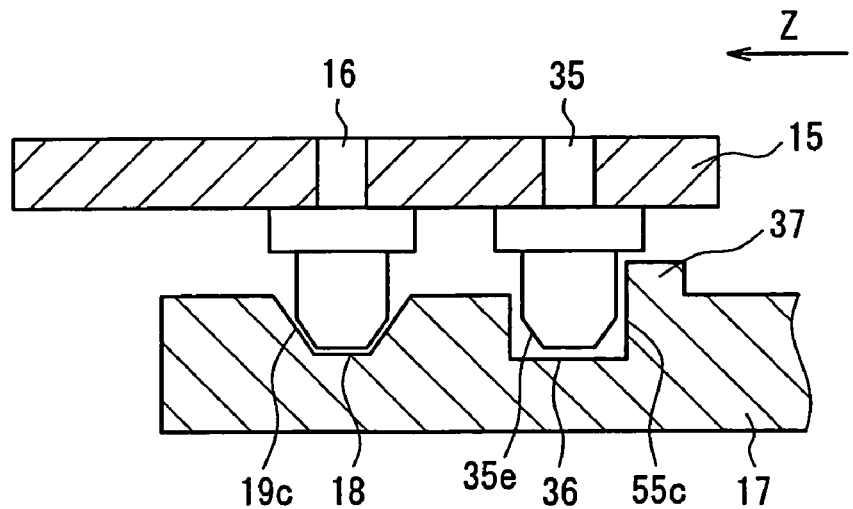
FIG. 5C is a sectional view showing the relationship between the cam groove and the cam pin when advancing the barrel.
Figure 6:
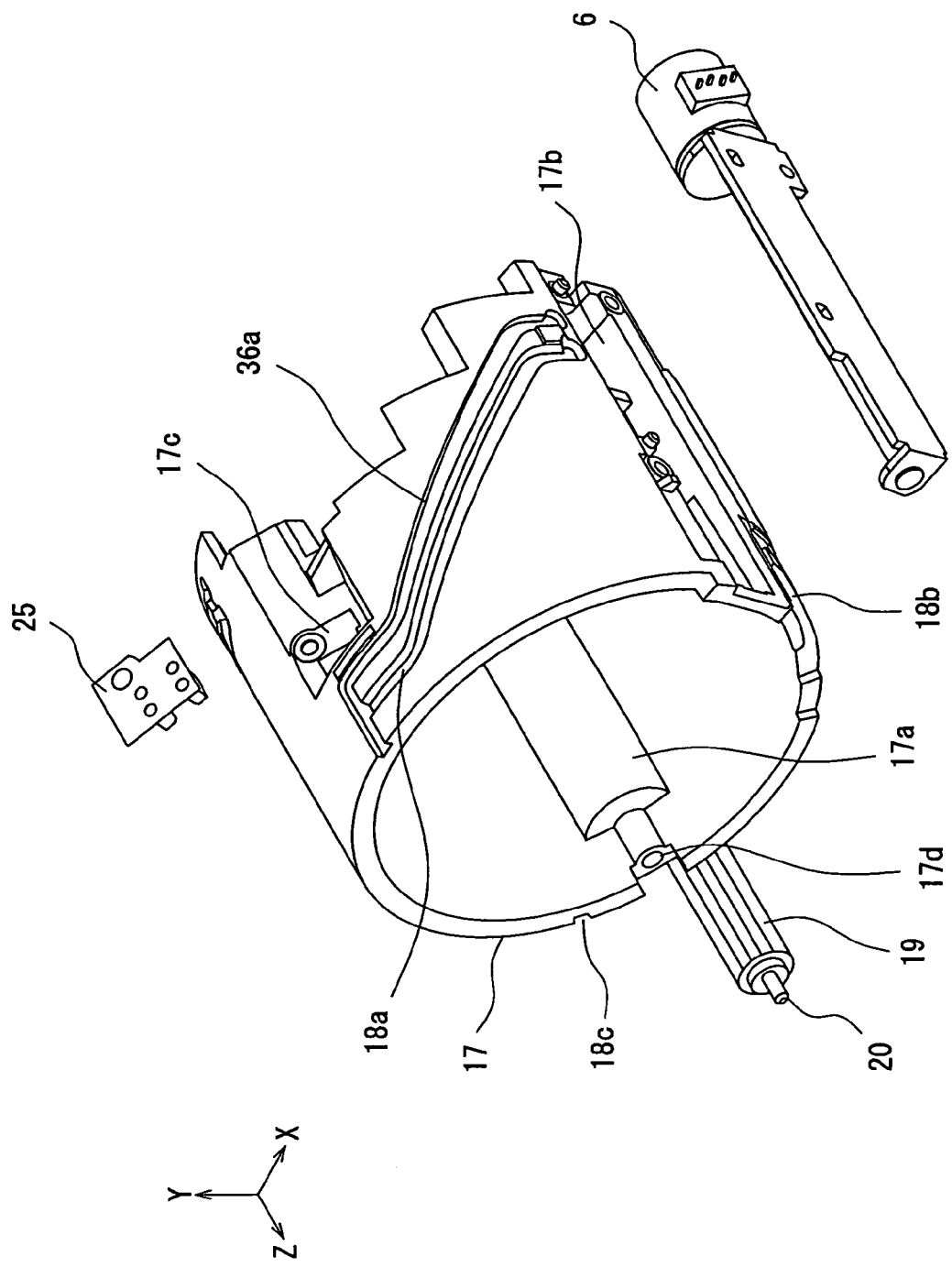
FIG. 6 is an exploded perspective view showing a cam frame in the collapsible lens barrel according to the embodiment of the present invention.
Figure 7:
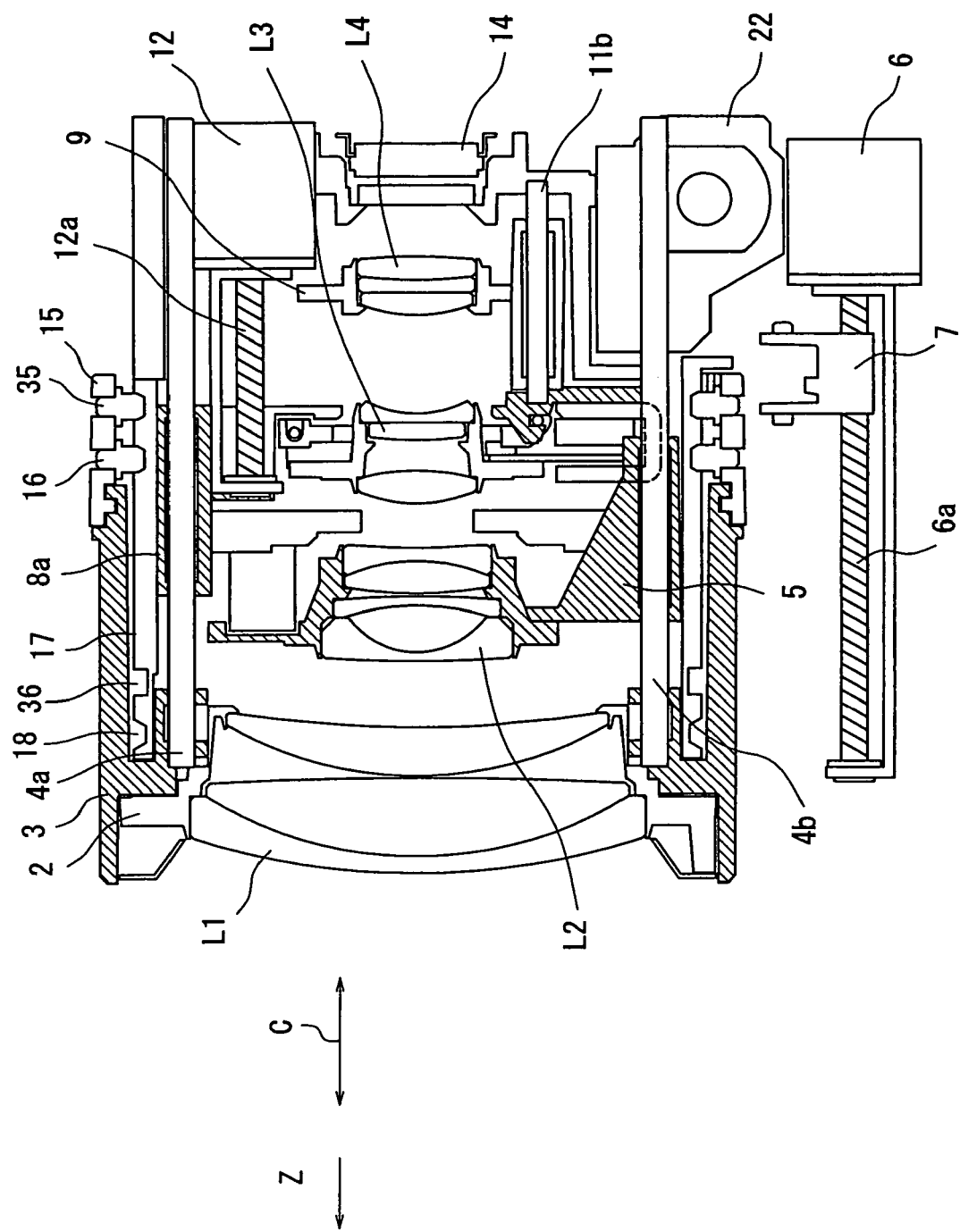
FIG. 7 is a sectional view showing the collapsible lens barrel when it is retracted according to the embodiment of the present invention.
Figure 8:
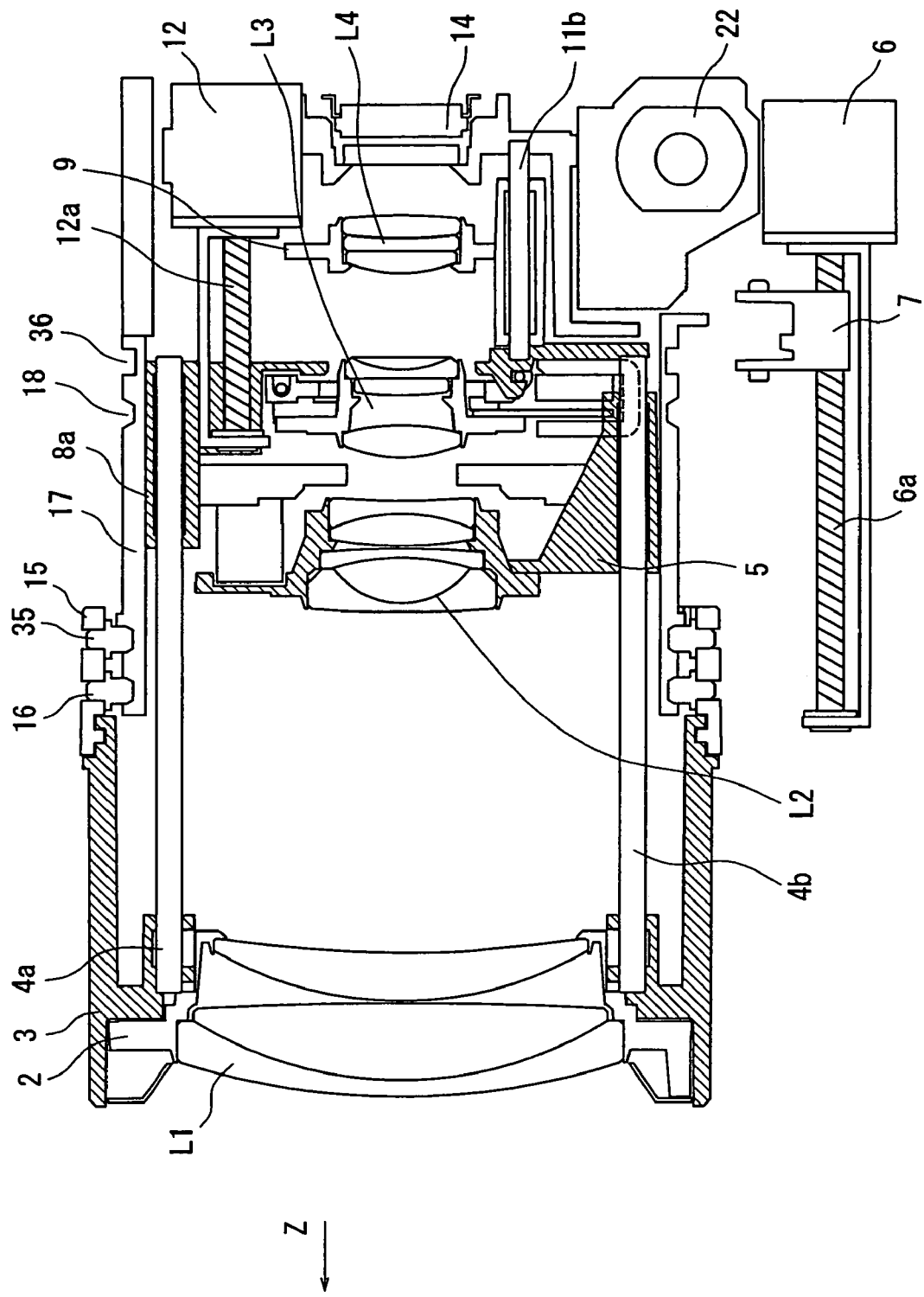
FIG. 8 is a sectional view showing the collapsible lens barrel when it is used at a telephoto end according to the embodiment of the present invention.
Figure 9:
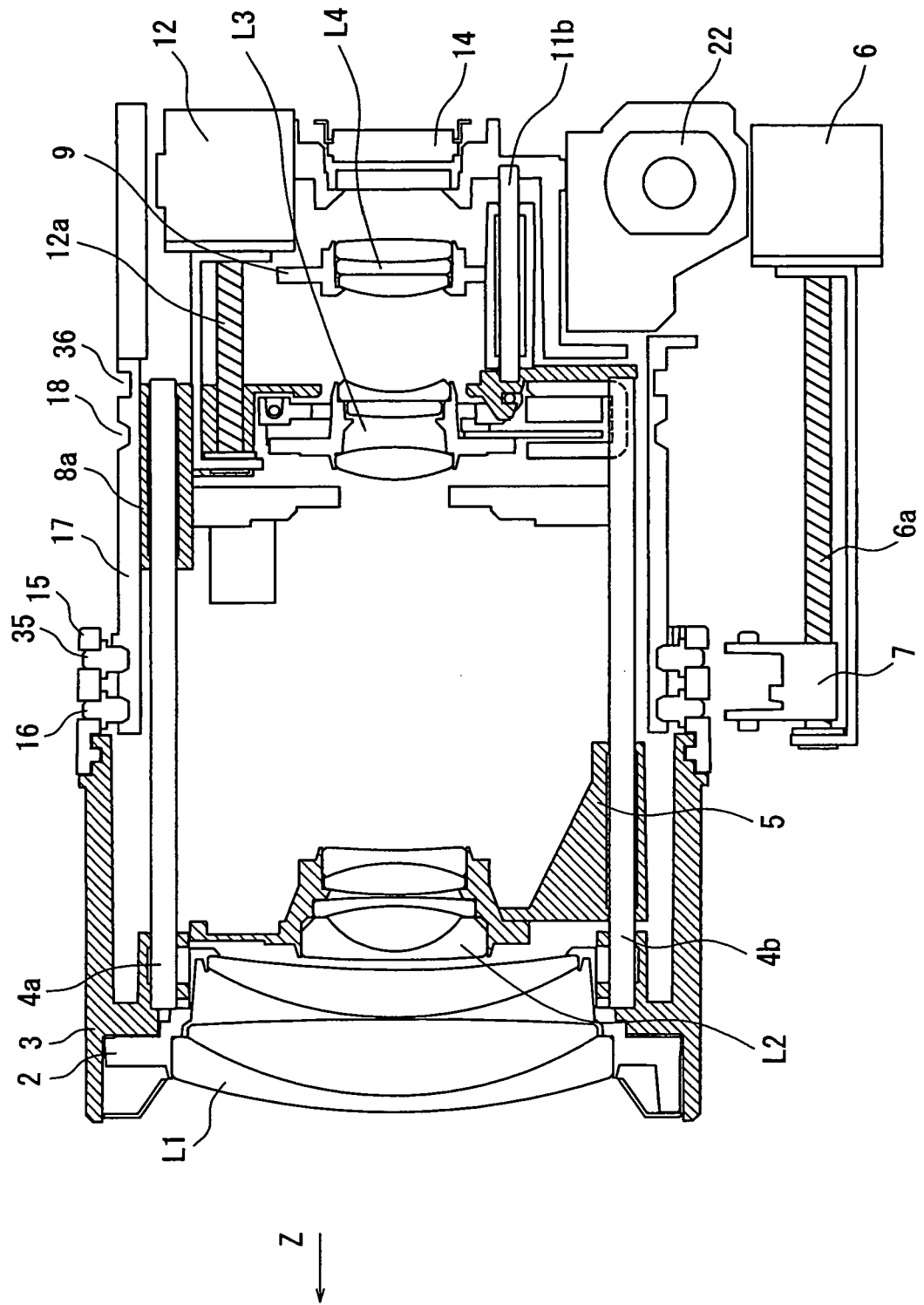
FIG. 9 is a sectional view showing the collapsible lens barrel when it is used at a wide angle end according to the embodiment of the present invention.
Figure 10:
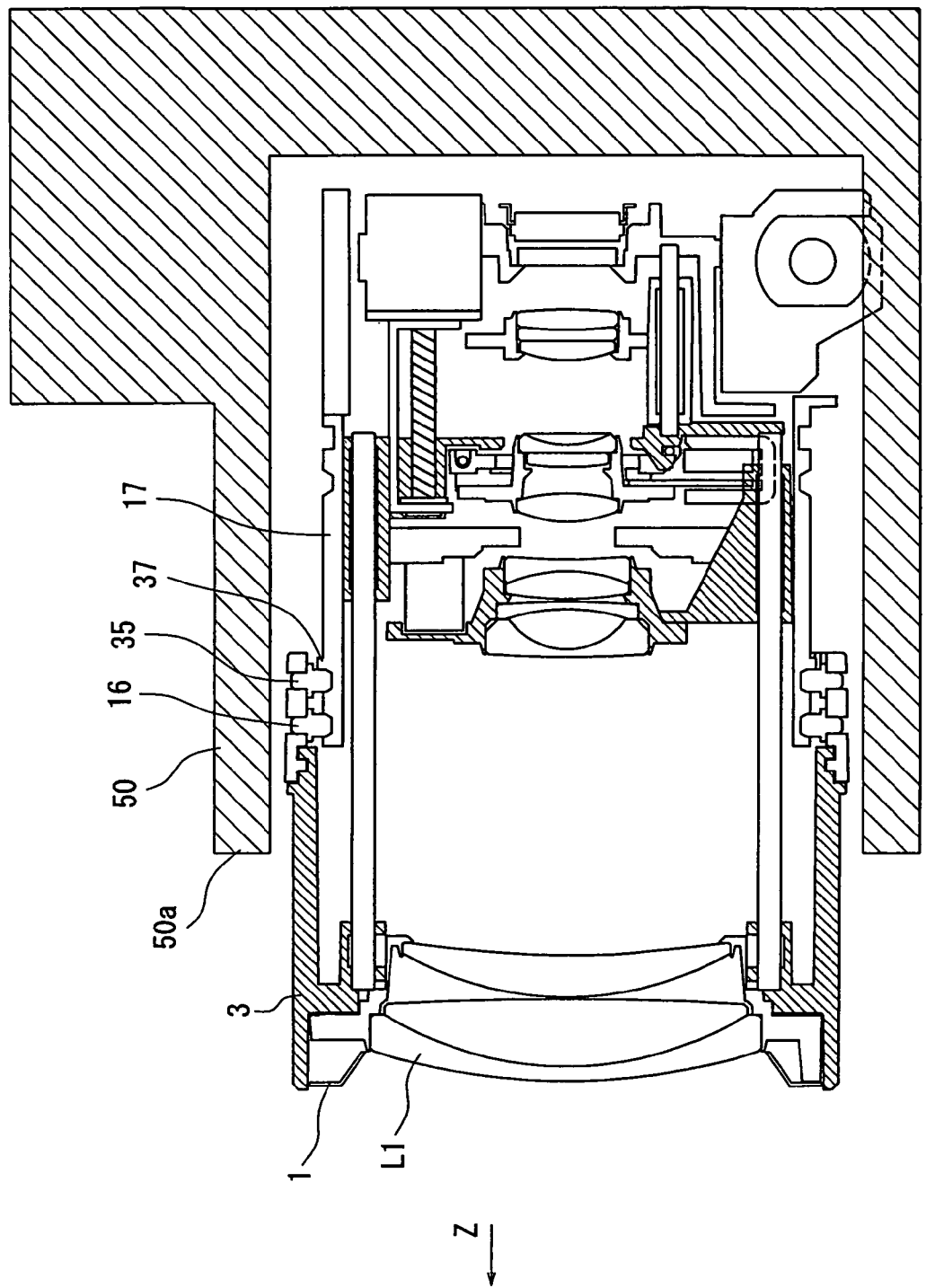
FIG. 10 is a sectional view showing a relationship between the collapsible lens barrel and a camera main body when the collapsible lens barrel in the embodiment of the present invention is advanced.
Figure 11:
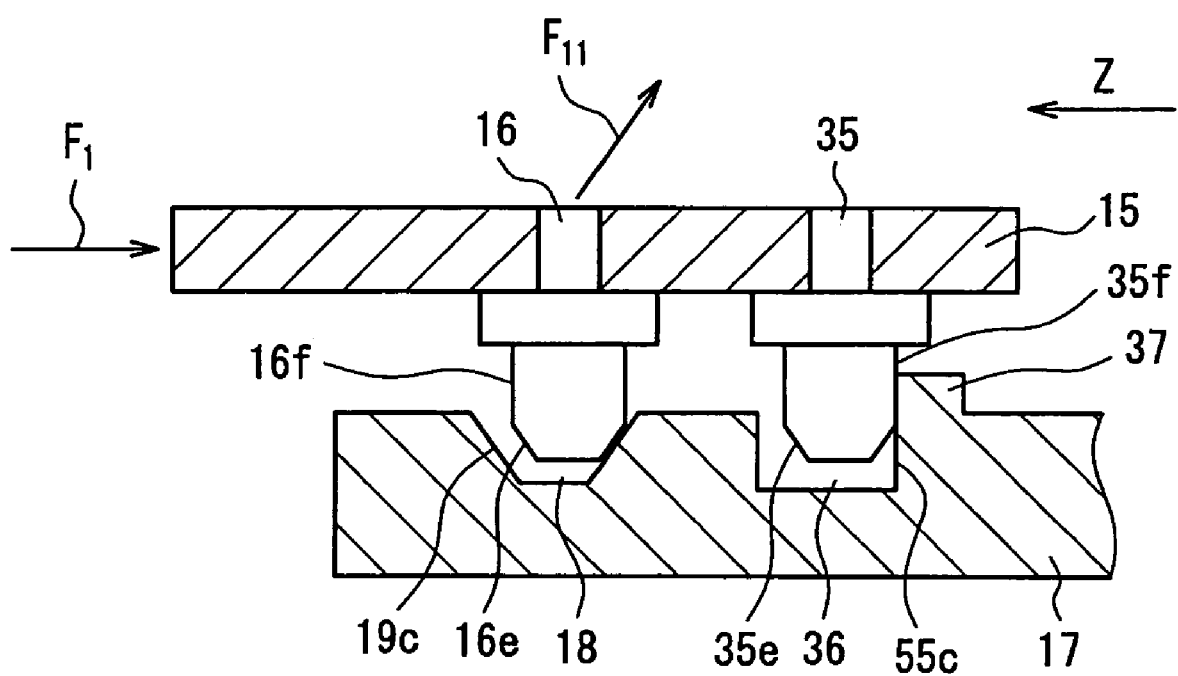
FIG. 11 is a sectional view for describing an effect of preventing the cam pin from demating when an external force is applied while the collapsible lens barrel in the embodiment of the present invention is advanced.
Figure 12:
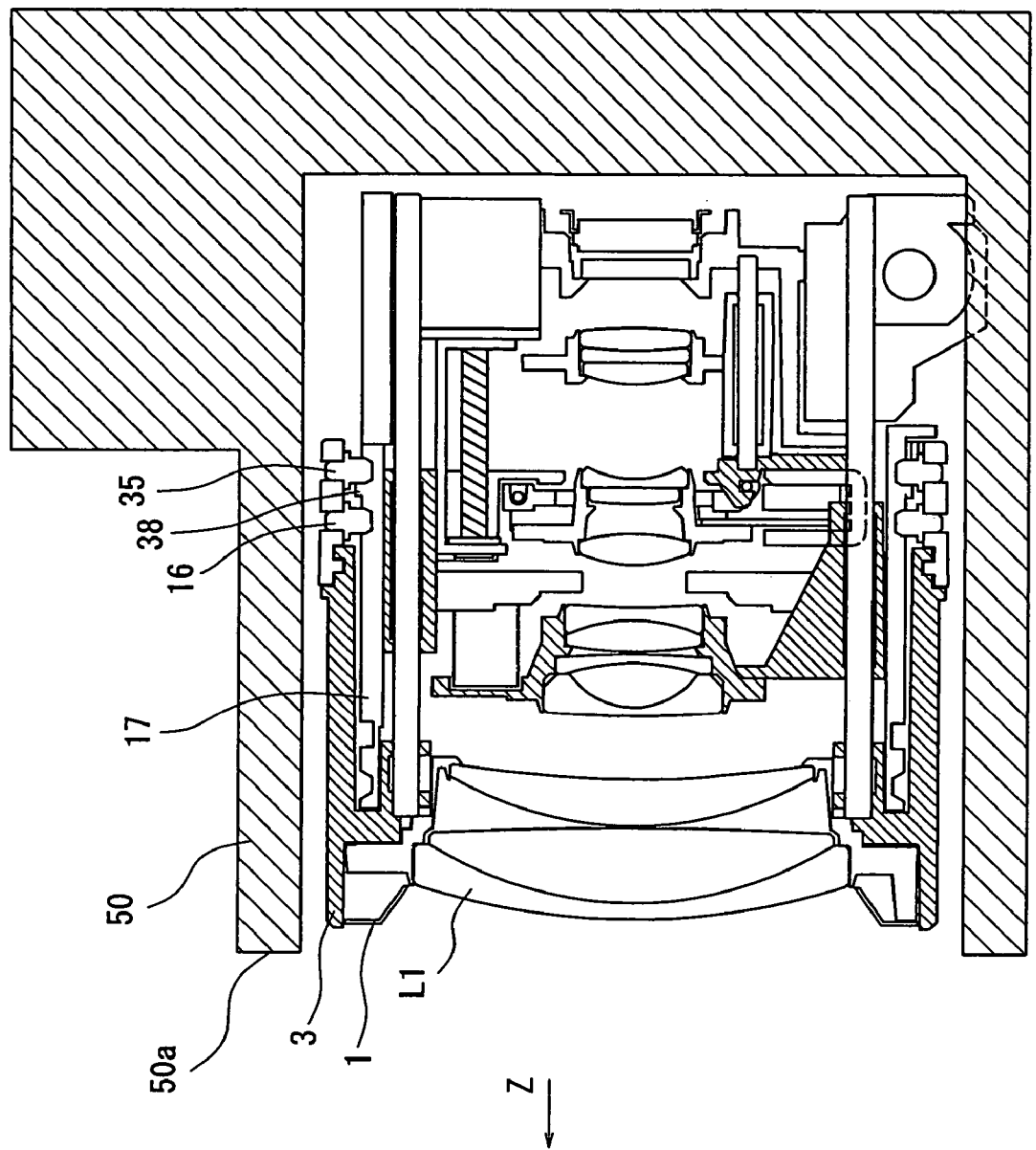
FIG. 12 is a sectional view showing the relationship between the collapsible lens barrel and the camera main body when the collapsible lens barrel in the embodiment of the present invention is collapsed.
Figure 13:
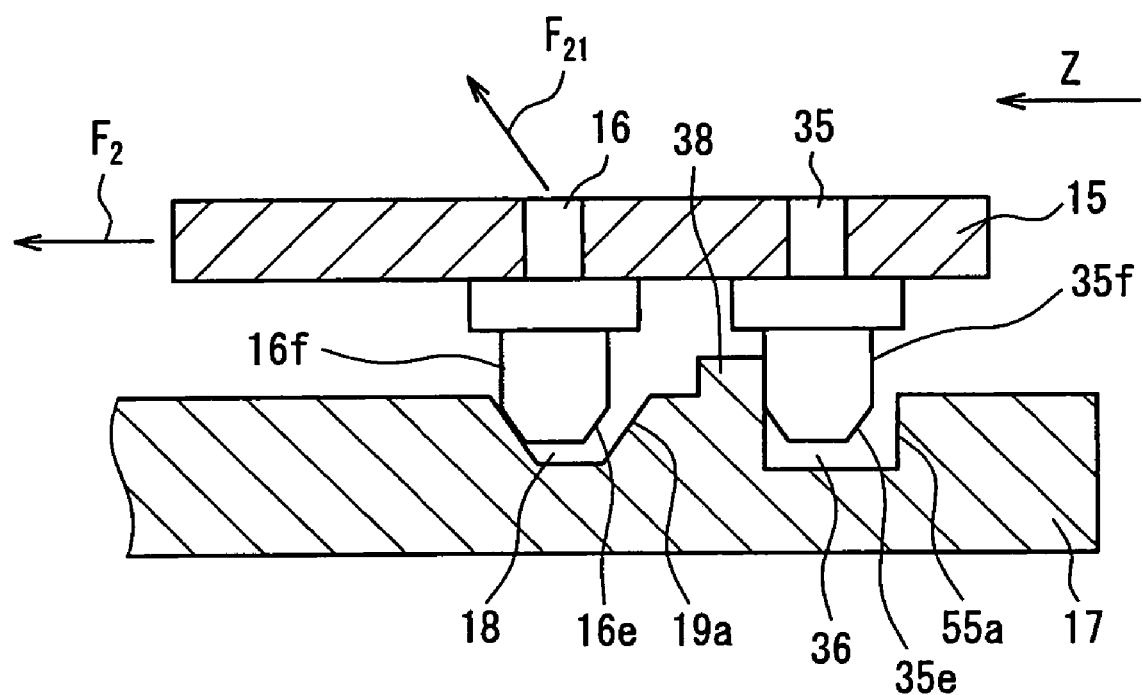
FIG. 13 is a sectional view for describing an effect of preventing the cam pin from demating when an external force is applied while the collapsible lens barrel in the embodiment of the present invention is retracted.

FIG. 1 is an exploded perspective view showing a collapsible lens barrel according to an embodiment of the present invention, FIG. 2 is an exploded perspective view for describing guide pole supporting portions in the collapsible lens barrel according to the embodiment of the present invention, FIG. 3A shows how lenses tilt in an ideal collapsible lens barrel, FIG. 3B shows how the lenses tilt in a conventional collapsible lens barrel, and FIG. 3C shows how the lenses tilt in the collapsible lens barrel according to the embodiment of the present invention, FIG. 4 is a developmental view of cam grooves in the collapsible lens barrel according to the embodiment of the present invention, FIGS. 5A, 5B and 5C are sectional views showing the relationship between the cam groove and the cam pin in the collapsible lens barrel in the embodiment of the present invention, FIG. 6 is an exploded perspective view showing a cam frame in the collapsible lens barrel according to the embodiment of the present invention, FIG. 7 is a sectional view showing the collapsible lens barrel when it is collapsed according to the embodiment of the present invention, FIG. 8 is a sectional view showing the collapsible lens barrel when it is used at a telephoto end according to the embodiment of the present invention, FIG. 9 is a sectional view showing the collapsible lens barrel when it is used at a wide angle end according to the embodiment of the present invention, FIG. 10 is a sectional view showing the relationship between the collapsible lens barrel and a camera main body when the collapsible lens barrel in the embodiment of the present invention is advanced, FIG. 11 is a sectional view for describing an effect of preventing the cam pin from demating when an external force is applied while the collapsible lens barrel in the embodiment of the present invention is advanced, FIG. 12 is a sectional view showing the relationship between the collapsible lens barrel and the camera main body when the collapsible lens barrel in the embodiment of the present invention is retracted, and FIG. 13 is a sectional view for describing an effect of preventing the cam pin from demating when an external force is applied while the collapsible lens barrel in the embodiment of the present invention is retracted.

A collapsible lens barrel 1 will be described referring to FIGS. 1 to 6. As shown in FIG. 1, an XYZ three-dimensional rectangular coordinate system is set, with an optical axis of the collapsible lens barrel being a Z axis (an object side being a positive side). L1 denotes a first group lens, L2 denotes a second group lens that moves along an optical axis (Z axis) for zooming, L3 denotes a third group lens for correcting an image blurring, and L4 denotes a fourth group lens that moves along the optical axis for correcting an image plane fluctuation caused by zooming and for achieving focus.

A first group holding frame 2 holds the first group lens L1 and is fixed to a tubular first group moving frame 3 with a screw or the like such that a center axis of the first group lens L1 is parallel with the optical axis. One end of each of two guide poles (guide members) 4a and 4b parallel to the optical axis is fixed to this first group moving frame 3.

A second group moving frame 5 holds the second group lens L2 and is supported by the above-mentioned two guide poles 4a and 4b so as to be slidable in the optical axis direction. Further, a feed screw 6a of a second group lens driving actuator 6 such as a stepping motor and a screw portion of a rack 7 provided in the second group moving frame 5 engage with each other, whereby the driving force of the second group lens driving actuator 6 causes the second group moving frame 5 to move in the optical axis direction for zooming.

A third group frame 8 holds an image blurring correcting lens group L3 (a third group lens) and constitutes an image blurring correcting device 31.

A fourth group moving frame 9 is supported by two guide poles 11a and 11b that are parallel with the optical axis and interposed between the third group frame 8 and a master flange 10, so that the fourth group moving frame 9 is slidable in the optical axis direction. Moreover, a feed screw 12a of a fourth group lens driving actuator 12 such as a stepping motor and a screw portion of a rack 13 provided in the fourth group moving frame 9 engage with each other, whereby the driving force of the fourth group lens driving actuator 12 causes the fourth group moving frame 9 to move in the optical axis direction for correcting the image plane fluctuation due to zooming and for achieving focus.

An imaging element (CCD) 14 is attached to the master flange 10.

Next, how to support the guide poles 4a and 4b will be described referring to FIG. 2.

The third group frame 8 is provided with a supporting portion 8a (on a main axis side) and a supporting portion 8b (on a rotation stopper side). The guide poles 4a and 4b penetrate through the supporting portions 8a and 8b, so that they are held in parallel with the optical axis. Since the guide poles 4a and 4b slide in the optical axis direction with respect to these two supporting portions 8a and 8b, the first group lens L1 held by the first group moving frame 3 fixed to one end of each of the guide poles 4a and 4b maintains its precision with respect to the image blurring correcting lens L3 provided in the third group frame 8. Furthermore, the guide poles 4a and 4b slidably penetrate through a supporting portion 5a (on the rotation stopper side) and a supporting portion 5b (on the main axis side) that are provided in the second group moving frame 5, whereby the second group moving frame 5 is supported slidably in the optical axis direction by the guide poles 4a and 4b. Consequently, the second group lens L2 held by the second group moving frame 5 maintains its precision with respect to the image blurring correcting lens L3 provided in the third group frame 8.

Herein, the relationship among the first group lens L1, the second group lens L2 and the third group lens L3 mentioned above will be described referring to FIGS. 3A to 3C. In these figures, arrows L1a and L2a indicate directions of center axes of the first group lens L1 and the second group lens L2, respectively.

FIG. 3A shows an ideal state of the three lens groups L1, L2 and L3, in which the center axis L1a of the first group lens L1 and the center axis L2a of the second group lens L2 are parallel with the Z axis (which is the optical axis of the lens barrel and corresponds to the center axis of the third group lens L3).

FIG. 3B shows the case in which the first group lens L1 and the second group lens L2 are supported by a system similar to a conventional lens barrel. Since the center axis L1a of the first group lens L1 and the center axis L2a of the second group lens L2 are neither parallel with each other nor parallel with the Z axis, it is likely that the optical performance will deteriorate.

FIG. 3C shows the case according to the present embodiment. The first group lens L1 and the second group lens L2 are supported by the same guide poles 4a and 4b. Therefore, even when the center axis L1a of the first group lens L1 and the center axis L2a of the second group lens L2 tilt with respect to the Z axis, the directions of these center axes L1a and L2a always coincide with each other. In other words, since the first group lens L1 and the second group lens L2 always tilt in the same direction with respect to the image blurring correcting lens group L3, which has the greatest influence on the optical performance, it is possible to minimize the deterioration of the optical performance.

Next, the configuration of moving the first group lens L1 in the optical axis direction will be described.

As shown in FIG. 1, a gear 15a is formed in a part of an inner peripheral surface of a substantially hollow cylindrical driving frame 15 on the side of the imaging element 14. Also, three protruding portions 15b are formed at substantially 120° intervals on the inner peripheral surface thereof on the object side (the positive side of the Z axis). The protruding portions 15b mate with three circumferential groove portions 3a provided in an outer peripheral surface of the first group moving frame 3 on the side of the imaging element 14, whereby the driving frame 15 can rotate relative to the first group moving frame 3 around the optical axis, and the driving frame 15 and the first group moving frame 3 move integrally in the optical axis direction. Furthermore, three cam pins 16a, 16b and 16c (these three cam pins 16a, 16b and 16c collectively are referred to as a cam pin 16) are press-fitted and fixed to the inner peripheral surface of the driving frame 15 at 120° intervals. Each of these cam pins 16a, 16b and 16c includes a tapered portion 16e formed at its tip and a cylindrical portion 16f on the inner peripheral surface side of the driving frame 15. Further, demating prevention pins 35a, 35b and 35c (these three demating prevention pins 35a, 35b and 35c collectively are referred to as a demating prevention pin 35) for preventing the cam pins 16a, 16b and 16c from demating from cam grooves 18a, 18b and 18c, which will be described later, are press-fitted and fixed to the side of the imaging element 14

(the negative side of the Z axis) of the cam pins 16a, 16b and 16c at 120° intervals. Similarly to the cam pins 16a, 16b and 16c, each of these demating prevention pins 35a, 35b and 35c includes a tapered portion 35e at its tip and a cylindrical portion 35f on the inner peripheral surface side of the driving frame 15. The cam pins 16a, 16b and 16c and the demating prevention pins 35a, 35b and 35c have the same shape, and thus the same components can be used therefor.

On an outer surface of a tubular cam frame 17, the three cam grooves 18a, 18b and 18c (these three cam grooves 18a, 18b and 18c collectively are referred to as a cam groove 18) are formed at substantially 120° intervals. On the side of the imaging element 14 of these three cam grooves 18a, 18b and 18c (the negative side of the Z axis), three demating prevention grooves 36a, 36b and 36c (these three demating prevention grooves 36a, 36b and 36c collectively are referred to as a demating prevention groove 36) are formed at substantially 120° intervals. The cam grooves 18a, 18b and 18c and the demating prevention grooves 36a, 36b and 36c are parallel with and close to each other.

FIG. 4 is a developmental view of the outer peripheral surface of the cam frame 17. The cam pins 16a, 16b and 16c provided in the driving frame 15 mate with the cam grooves 18a, 18b and 18c of the cam frame 17, respectively. Each of the cam grooves 18a, 18b and 18c has a portion 19a that is substantially parallel with the circumferential direction of the cam frame 17 on the side of the imaging element 14 (the negative side of the Z axis), a portion 19c that is substantially parallel with the circumferential direction of the cam frame 17 on the object side (the positive side of the Z axis) and a portion 19b that connects spirally the portion 19a and the portion 19c. When the cam pins 16a, 16b and 16c are located in the portion 19a, the first group lens L1 is retracted toward the side of the imaging element 14 (a collapsed state). From this state, the driving frame 15 rotates around the optical axis, so that the cam pins 16a, 16b and 16c move through the portion 19b and reach the portion 19c. When the cam pins 16a, 16b and 16c are located in the portion 19c, the first group lens L1 is advanced toward the object side.

The demating prevention pins 35a, 35b and 35c mate with the demating prevention grooves 36a, 36b and 36c, respectively. The demating prevention grooves 36a, 36b and 36c also have portions 55a, 55b and 55c that are parallel with the portions 19a, 19b and 19c of the cam grooves 18a, 18b and 18c, respectively. The demating prevention pins 35a, 35b and 35c are located in the portion 55a when the first group lens L1 is in the collapsed state, pass through the portion 55b while the first group lens L1 is being advanced toward the object side and are located in the portion 55c when the first group lens L1 has been advanced on the object side.

FIGS. 5A, 5B and 5C are sectional views along a plane parallel with the Z axis showing how the cam pin 16 mates with the cam groove 18 and the demating prevention pin 35 mates with the demating prevention groove 36, with FIG. 5A illustrating the state in which the first group lens L1 is retracted, FIG. 5B illustrating the state in which the first group lens L1 is being advanced from the retracted state toward the object side and FIG. 5C illustrating the state in which the first group lens L1 has been advanced completely to the object side.

As shown in FIGS. 5A to 5C, the cross-section of the cam groove 18 is substantially the same in all of the portions 19a, 19b and 19c and is a trapezoidal shape, with its top side longer than bottom side, having substantially the same taper angle as the tapered portion 16e at the tip of the cam pin 16.

On the other hand, the cross-section of the demating prevention groove 36 is a rectangular shape whose paired opposing side walls are substantially perpendicular to the optical axis in the portions 55a and 55c at both ends and is a trapezoidal shape, with its top side longer than bottom side, having substantially the same taper angle as the tapered portion 35e at the tip of the demating prevention pin 35 in the portion 55b between the portions 55a and 55c similarly to the portion 19b. Incidentally, the cross-section of the demating prevention groove 36 in the portion 55b may be a rectangular shape similar to the cross-section in the portions 55a and 55c.

In a usual state where no external force is applied to the lens barrel, the tapered portion 16e of the cam pin 16 is in contact with the cam groove 18 regardless of where the first group lens L1 is located. On the other hand, the portion 55b of the demating prevention groove 36 is about 0.2 mm wider along the optical axis direction (the Z-axis direction) than the tapered portion 35e of the demating prevention pin 35, the portions 55a and 55c of the demating prevention groove 36 are about 0.2 mm wider along the optical axis direction than the outer diameter of the cylindrical portion 35f of the demating prevention pin 35, and the demating prevention groove 36 is about 0.1 mm deeper than the cam groove 18 along its entire length. Therefore, the demating prevention pin 35 and the demating prevention groove 36 are not in contact with each other with a clearance of about 0.1 mm therebetween. Accordingly, when the first group lens L1 is driven in the usual state, the demating prevention pin 35 and the demating prevention groove 36 do not contact each other, thus generating no load (frictional resistance).

As shown in FIG. 5C, in the portion 55c of the demating prevention groove 36, the wall surface of the demating prevention groove 36 on the side of the imaging element 14 (the negative side of the Z axis) is extended outward, thus forming a protrusion (a first protrusion) 37 facing the cylindrical portion 35f of the demating prevention pin 35. Also, as shown in FIG. 5A, in the portion 55a of the demating prevention groove 36, the wall surface of the demating prevention groove 36 on the object side (the positive side of the Z axis) is extended outward, thus forming a protrusion (a second protrusion) 38 facing the cylindrical portion 35f of the demating prevention pin 35.

On the outer peripheral surface of the cam frame 17, bearing portions 17d for holding driving gear shafts 20 projecting at both ends of a spline-like driving gear 19 rotatably and a driving gear mounting portion (a recessed portion) 17a that is recessed in a hemicylindrical shape for avoiding an interference with the driving gear 19 are formed between the cam grooves 18b and 18c, whereby the driving gear 19 is held rotatably on the outer peripheral surface of the cam frame 17. The driving gear 19 transmits a driving force of a driving unit 21, which will be described later, mounted to the master flange 10 to the gear portion 15a provided in the driving frame 15. Accordingly, the rotation of the driving gear 19 causes the driving frame 15 to rotate around the optical axis. At this time, the cam pins 16a, 16b and 16c provided in the driving frame 15 move in the cam grooves 18a, 18b and 18c of the cam frame 17, whereby the driving frame 15 also moves in the optical axis direction. Here, since the two guide poles 4a and 4b fixed to the first group moving frame 3 penetrate through the supporting portions 8a and 8b of the third group frame 8, the rotation of the first group moving frame 3 around the optical axis is restricted, so that the first group moving frame 3 moves straight along the optical axis direction as the driving frame 15 moves along the optical axis direction.

The driving actuator 6 of the second group moving frame 5 is fixed to a mounting portion 17b of the cam frame 17. Also, the driving actuator 12 of the fourth group moving frame 9 is fixed to a mounting portion 10a of the master flange 10. The driving unit 21 for transmitting the driving force to the driving gear 19 includes a driving actuator 22 and a reduction gear unit 23 constituted by a plurality of gears and is fixed to a mounting portion 10b of the master flange 10.

A shutter unit 24 is constituted by a diaphragm blade and a shutter blade that form a constant aperture diameter for controlling an exposure amount and an exposure time of the imaging element 14.

A home position detecting sensor 25 for the second group moving frame 5 is a photo-detector sensor including a light-emitting element and a light-receiving element and detects the position of the second group moving frame 5 in the optical axis direction, namely, a home position of the second group lens L2. A home position detecting sensor 26 for the fourth group moving frame 9 detects the position of the fourth group moving frame 9 in the optical axis direction, namely, a home position of the fourth group lens L4. A home position detecting sensor 27 for the driving frame 15 detects the position of the driving frame 15 in a rotational direction, namely, home positions of the first group moving frame 3 and the first group lens L1 that move as one piece with the driving frame 15.

The image blurring correcting device 31 moves the image blurring correcting lens group L3 for correcting an image blurring at the time of image capturing in a pitching direction, which is a first direction (a Y direction), and a yawing direction, which is a second direction (an X direction). A first electromagnetic actuator 41y generates a driving force in the Y direction, and a second electromagnetic actuator 41x generates a driving force in the X direction, so that the image blurring correcting lens group L3 is driven in the X and Y directions that are substantially perpendicular to the optical axis Z.

As shown in FIG. 6, the second group lens driving actuator 6 is mounted to the mounting portion 17b of the cam frame 17. The home position detecting sensor 25 of the second group lens L2 is mounted onto a mounting portion 17c of the cam frame 17, and a blade 5c provided in the second group moving frame 5 passes in front of the home position detecting sensor 25 and blocks light, thereby allowing the home position to be detected. Further, as described earlier, the driving gear 19 is mounted to the bearing portions 17d and the driving gear mounting portion (recessed portion) 17a of the cam frame 17.

FIG. 4 shows the relationship of the three cam grooves 18a, 18b and 18c, the three demating prevention grooves 36a, 36b and 36c and the three mounting portions 17a, 17b and 17c when they are developed. In other words, the mounting portion 17a is provided between the cam grooves 18b and 18c, the mounting portion 17b is provided between the cam grooves 18a and 18b, and the mounting portion 17c is provided between the cam grooves 18c and 18a. By providing the mounting portions 17a, 17b and 17c between these cam grooves in this way, it becomes possible to mount the driving gear 19, the second group lens driving actuator 6 and the home position detecting sensor 25 to the cam frame 17 with the mounting portions 17a, 17b and 17c not interfering with the cam grooves 18a, 18b and 18c.

In the following, the operation of the collapsible lens barrel 1 constituted as above will be explained.

First, in the operation of the collapsible lens barrel 1, an operation of shifting from a non-capturing (non-use) state shown in FIG. 7 via a (telephoto end) state shown in FIG. 8 to a capturing (wide angle end) state shown in FIG. 9 will be described.

In the non, capturing state shown in FIG. 7, turning on a power source switch or the like of a camera main body starts a state ready for image capturing. First, the first group lens driving actuator 22 for driving the first group lens L1 rotates, so that the driving gear 19 is rotated via the reduction gear unit 23. The rotation of the driving gear 19 causes the driving frame 15, which engages with the driving gear 19, both to rotate around the optical axis and to move in the cam grooves 18a, 18b and 18c along the optical axis direction. After the home position detecting sensor 27 is initialized, the driving frame 15 moves in an object direction (the Z-axis direction), whereby the first group moving frame 3 also moves in the object direction. Then, when a rotation amount detecting sensor, which is not shown in the figure, detects that the first group lens driving actuator 22 has rotated by a predetermined rotation amount, the first group moving frame 3 moves to a predetermined position, and then the rotation of the first group lens driving actuator 22 stops. At this stop position, the cam pins 16a, 16b and 16c already have reached the portion 19c of the cam grooves 18a, 18b and 18c that is substantially parallel with the circumferential direction of the cam frame 17 in the developmental view of the cam grooves in FIG. 4. Also, the demating prevention pins 35a, 35b and 35c already have reached the portion 55c of the demating prevention grooves 36a, 36b and 36c. FIG. 8 shows this state.

Next, the second group lens driving actuator 6 rotates and drives the rack 7 via the feed screw 6a, so that the second group moving frame 5 starts moving along the Z axis. Then, after initializing the home position detecting sensor 25, the second group moving frame 5 moves in the object direction and stops at the wide angle end shown in FIG. 9, so that the camera main body is now able to capture an image.

Here, the first group moving frame 3 and the second group moving frame 5 move to a predetermined position while being supported by the same guide poles 4a and 4b held by the supporting portions 8a and 8b in the third group frame 8. Accordingly, even when the first group lens L1 and the second group lens L2 tilt with respect to the optical axis, a certain optical performance can be secured because the directions of the tilt are the same with respect to the image blurring correcting lens group L3.

At the time of actual image capturing, the second group lens driving actuator 6 and the fourth group lens driving actuator 12 respectively perform a zooming operation and an operation of correcting an image plane fluctuation due to zooming and achieving focus. When zooming, an image is captured at the wide angle end in the state shown in FIG. 9 and at the telephoto end in the state shown in FIG. 8 in which the second group lens L2 is moved to the side of the imaging element 14 (the negative side of the Z axis). Thus, it is possible to capture an image at an arbitrary position from the wide angle end to the telephoto end.

The following is a description of the situation in which an external force is applied to the first group driving frame 3 in the capturing state shown in FIGS. 8 and 9. The situation in which an external force is applied to the first group frame 3, for example, corresponds to the case where a camera is dropped by a user and hits the ground with its first group lens L1 facing downward during image capturing, namely, in the state shown in FIG. 10 where the collapsible lens barrel 1 projects beyond a front surface 50a of an outer case 50 of the camera main body. When the camera is dropped with its first group lens L1 facing downward, a force toward the imaging element 14 (the negative side of the Z axis) acts on a surface of the first group driving frame 3 on the object side (the positive side of the Z axis), so that the first group driving frame 3 and the driving frame 15 connected thereto in such a manner as to be rotatable around the optical axis are pressed toward the side of the imaging element 14. In other words, in FIG. 5C, the force in the negative direction of the Z axis acts on the driving frame 15.

Referring to FIG. 11, this phenomenon will be explained. A force F1 in the negative direction of the Z axis acts on the driving frame 15, whereby the cam pin 16 and the demating prevention pin 35 that are provided in the driving frame 15 move in the negative direction of the Z axis relatively to the cam groove 18 and the demating prevention groove 36. Since the gap between the cam pin 16 and the cam groove 18 is smaller than that between the demating prevention pin 35 and the demating prevention groove 36, the tapered portion 16e at the tip of the cam pin 16 and the tapered surface of the side wall of the cam groove 18 collide with each other. As a result, the cam pin 16 is subjected to a reaction force in the direction indicated by an arrow F11 from the cam groove 18 and nearly demates from the cam groove 18. However, at the next moment, the cylindrical portion 35f of the demating prevention pin 35 collides with a lateral surface of the protrusion 37 formed on the edge of the demating prevention groove 36. Since the surfaces of the cylindrical portion 35f and the protrusion 37 colliding with each other are perpendicular to the Z axis, the collision between the cylindrical portion 35f and the protrusion 37 stops a further movement of the driving frame 15 relative to the cam frame 17 in the negative direction of the Z axis. Accordingly, the demating of the cam pin 16 from the cam groove 18 is avoided. Consequently, it is possible to prevent the malfunction of the collapsing mechanism caused by the demating of the cam pin 16 from the cam groove 18 due to the impact at the time of dropping the camera.

Next, an operation of shifting from the capturing state shown in FIG. 9 via the state shown in FIG. 8 to the non-capturing state shown in FIG. 7 will be described.

When the power source of the camera is switched off at an arbitrary zooming position, the image capturing ends. The second group moving frame 5 first is moved to the side of the imaging element 14 by the second group lens driving actuator 6, thus creating the state shown in FIG. 8. Subsequently, the first group lens driving actuator 22 rotates, thereby rotating the driving gear 19 in a direction opposite to the direction described above via the reduction gear unit 23. The rotation of the driving gear 19 causes the driving frame 15, which is in engagement with the driving gear 19, to rotate around the optical axis, and at the same time, the cam grooves 18a, 18b and 18c allow the driving frame 15 to move in the direction of the imaging element 14, so that the first group moving frame 3 also moves. Thereafter, when the home position detecting sensor 27 detects the rotation of the driving frame 15, the first group moving frame 3 moves to a predetermined position, and then the rotation of the first group lens driving actuator 22 stops. At this stop position, the cam pins 16a, 16b and 16c already have reached the portion 19a that is substantially parallel with the circumferential direction of the cam frame 17 of the cam groves 18a, 18b and 18c in the developmental view of the cam grooves in FIG. 4. Also, the demating prevention pins 35a, 35b and 35c already have reached the portion 55a of the demating prevention grooves 36a, 36b and 36c. This achieves the collapsed state shown in FIG. 7 in which the length is reduced by a length C compared with the capturing state.

The following is a description of the situation in which an external force is applied to the first group driving frame 3 in the collapsed state shown in FIG. 7. In the collapsed state, as shown in FIG. 12, the collapsible lens barrel 1 is retracted inward within the front surface 50a of the outer case 50 of the camera main body. In the case where the camera is dropped by the user with its first group lens L1 facing downward in this state, the front surface 50a of the outer case 50 of the camera main body collides with the ground. At this moment of collision, the outer case 50 is subjected to an impact force in a direction opposite to the gravitational direction from the ground. At the same time, the collapsible lens barrel 1 is subjected to an inertial force in the gravitational direction, so that the collapsible lens barrel 1 nearly pops out of the camera main body toward the object side (the positive side of the Z axis). Thus, a force acts in a direction that the first group driving frame 3 and the driving frame 15 connected thereto in such a manner as to be rotatable around the optical axis in the collapsible lens barrel 1 are pulled out toward the object side (the positive side of the Z axis) from the cam frame 17. In other words, in FIG. 5A, the force in the positive direction of the Z axis acts on the driving frame 15.

Referring to FIG. 13, this phenomenon will be explained. A force F2 in the positive direction of the Z axis acts on the driving frame 15, whereby the cam pin 16 and the demating prevention pin 35 that are provided in the driving frame 15 move in the positive direction of the Z axis relative to the cam groove 18 and the demating prevention groove 36. Since the gap between the cam pin 16 and the cam groove 18 is smaller than that between the demating prevention pin 35 and the demating prevention groove 36, the tapered portion 16e at the tip of the cam pin 16 and the tapered surface of the side wall of the cam groove 18 collide with each other. As a result, the cam pin 16 is subjected to a reaction force in the direction indicated by an arrow F21 from the cam groove 18 and nearly demates from the cam groove 18. However, at the next moment, the cylindrical portion 35f of the demating prevention pin 35 collides with a lateral surface of the protrusion 38 formed on the edge of the demating prevention groove 36. Since the surfaces of the cylindrical portion 35f and the protrusion 38 colliding with each other are perpendicular to the Z axis, the collision between the cylindrical portion 35f and the protrusion 38 stops a further movement of the driving frame 15 relative to the cam frame 17 in the positive direction of the Z axis. Accordingly, the demating of the cam pin 16 from the cam groove 18 is avoided. Consequently, it is possible to prevent the malfunction of the collapsing mechanism caused by the demating of the cam pin 16 from the cam groove 18 due to the impact at the time of dropping the camera.

Here, in a collapsing operation of changing the length of the collapsible lens barrel 1 of the present embodiment along the optical axis direction, the first group lens driving actuator 22 for driving the first group lens L1 is used. In a zooming operation, the second group lens driving actuator 6 is used alone. Thus, since the zooming operation in an actual image capturing is carried out with the first group lens L1 being advanced, there is no need to operate the first group lens driving actuator 22, and the second group lens driving actuator 6 alone is driven to move the second group lens L2 to a predetermined position between FIG. 8 and FIG. 9 for zooming. Accordingly, when conducting image capturing such as a zooming operation, it is not necessary to advance and retract a barrel according to a zooming factor unlike a conventional collapsible lens barrel. In a conventional collapsible lens barrel, since a cam barrel was rotated to drive a lens in the zooming operation, a zooming speed was low and a driving noise was large. On the other hand, in the collapsible lens barrel 1 according to the present invention, a stepping motor is used as the second group lens driving actuator 6, and the second group moving frame 5 is driven directly via the feed screw 6a attached to this stepping motor, achieving a fast feed speed and a small operation noise. In this manner, even a collapsible lens barrel can achieve a faster zooming speed and a lower zooming noise.

Further, at the time of image capturing, the cam pins 16a, 16b and 16c are located in the portion 19c in the cam grooves 18a, 18b and 18c and the demating prevention pins 35a, 35b and 35c are located in the portion 55c in the demating prevention grooves 36a, 36b and 36c, regardless of the zooming factor. At the time of being collapsed (non-capturing), the cam pins 16a, 16b and 16c are located in the portion 19a in the cam grooves 18a, 18b and 18c and the demating prevention pins 35a, 35b and 35c are located in the portion 55a in the demating prevention grooves 36a, 36b and 36c. Thus, the first protrusion 37 provided in the portion 55c in the demating prevention grooves 36a, 36b and 36c improves the shock resistance to dropping or the like at the time of image capturing, and the second protrusion 38 provided in the portion 55a in the demating prevention grooves 36a, 36b and 36c improves the shock resistance to dropping or the like at the time of being retracted. In other words, simply by providing the first protrusion 37 and the second protrusion 38 at both ends of the demating prevention grooves 36a, 36b and 36c, it becomes possible to prevent the cam pins 16a, 16b and 16c from demating from the cam grooves 18a, 18b and 18c in most situations except for a short time period during which the first group lens L1 is driven when the power source of the camera main body is turned on and off.

As described above, in accordance with the present embodiment, the protrusion 37 is provided on the side of the imaging element 14 of the portion 55c of the demating prevention groove 36 where the demating prevention pin 35 is located when the collapsible lens barrel is advanced, thereby preventing the cam pin 16 from being disconnected from the cam groove 18 in the case where the first group driving frame 3 is subjected to the force toward the side of the imaging element 14 when the collapsible lens barrel is advanced. Therefore, even when the camera is dropped by a user at the time of image capturing, for example, it still is possible to maintain a sufficient strength.

Further, the protrusion 38 is provided on the object side of the portion 55a of the demating prevention groove 36 where the demating prevention pin 35 is located when the collapsible lens barrel is collapsed, thereby preventing the cam pin 16 from being disconnected from the cam groove 18 in the case where the first group driving frame 3 is subjected to the force toward the object side when the collapsible lens barrel is collapsed. Therefore, even when the camera is dropped by a user when it is not in use, for example, it still is possible to maintain a sufficient strength.

Moreover, since identical components are used as the cam pin 16 and the demating prevention pin 35, the number of components can be reduced. In addition, it is possible to prevent an error of reversing attachment positions at the time of installing the cam pin 16 and the demating prevention pin 35 to the driving frame 15, so that the camera becomes easier to assemble.

Additionally, it becomes possible to drive the first group lens L1 and the second group lens L2 individually, so that the first group lens L1 does not have to be driven when driving the second group lens L2 for zooming. Consequently, even a collapsible lens barrel can achieve a faster zooming speed and a lower zooming noise. Thus, a user can change the angle of view instantly, making it possible to chase a subject, capture a moving image, etc. easily, which have been difficult with conventional DSCs.

Further, the structure in which the first group lens L1 and the second group lens L2 tilt at least the same direction with respect to the image blurring correcting lens L3 allows the entire length in non use to be reduced while minimizing the reduction of optical performance.

Although the embodiment described above has been directed to an example in which the protrusions 37 and 38 are provided at both ends of the demating prevention groove 36, the present invention is not limited to this. Only one of the protrusions 37 and 38 may be provided. In that case, it is preferable to provide only the protrusion 37 because a camera generally is more likely to be dropped when it is in use.

Further, although the embodiment described above has been directed to an example in which the collapsible lens barrel 1 is retracted within the outer case 50 when the camera is not in use, the collapsible lens barrel 1 also can be used for a camera in which the tip of its collapsible lens barrel 1 projects beyond the outer case 50 also when the camera is not in use. In such a camera, if the camera is dropped with its first group lens L1 facing downward when it is not in use (collapsed), an external force toward the side of the imaging element 14 is applied to the first group driving frame 3. In order to prevent the cam pin 16 from being disconnected from the cam groove 18 due to the impact at this time, a protrusion (a second protrusion) similar to the protrusion 37 shown in FIG. 5C may be formed on the side of the imaging element 14 of the portion 55a in the demating prevention groove 36. Even in a camera in which the collapsible lens barrel 1 is retracted within the outer case 50 when it is not in use, this second protrusion on the side of the imaging element 14 of the portion 55a in the demating prevention groove 36 also is useful for preventing the cam pin 16 from being disconnected from the cam groove 18 due to the impact when the camera is dropped with its first group lens L1 facing upward when not in use (collapsed).

Also, a protrusion (a first protrusion) similar to the protrusion 38 shown in FIG. 5A may be formed on the object side of the portion 55c in the demating prevention groove 36. With this first protrusion, even if a force toward the object side should act on the first group driving frame 3 when the collapsible lens barrel 1 is expanded, it is possible to prevent the cam pin 16 from being disconnected from the cam groove 18.

In this way, in the collapsible lens barrel according to the present invention, a protrusion is formed at one or more arbitrarily selected positions out of four positions consisting of both the edges in the Z-axis direction of the portion 55a and both the edges in the Z-axis direction of the portion 55c of the demating prevention groove 36. Which position the protrusions should be formed at may be determined according to a possible external force that acts on a camera and a collapsible lens barrel mounted thereon. By providing the protrusions (four protrusions in total) at all of the four positions mentioned above, the safety at the time of dropping the camera or the like can be enhanced still further.

Furthermore, although the demating prevention pin 35 and the demating prevention groove 36 are provided for the purpose of preventing the cam pin 16 from being disconnected from the cam groove 18 in the embodiment described above, the present invention is not limited to this. For example, a protrusion similar to the above-described protrusions 37 and 38 may be formed at one or more arbitrarily selected positions out of four positions consisting of both the edges in the Z-axis direction of the portion 19a and both the edges in the Z-axis direction of the portion 19c of the cam groove 18. With this structure, when an external force moves the cam pin 16 relatively to the cam groove 18 along the Z-axis direction, the tapered portion 16e at the tip of the cam pin 16 first collides with the tapered surface of the side wall of the cam groove 18, and thereafter, the cylindrical portion 16f of the cam pin 16 collides with the protrusion, thereby preventing the cam pin 16 from demating from the cam groove 18. Therefore, this structure eliminates the need for the demating prevention pin 35, so that the number of components and assembling processes can be reduced. Further, the demating prevention groove 36 does not have to be formed in the cam frame 17, and this contributes to a miniaturization of the cam frame 17. Which of the four positions consisting of both the edges in the Z-axis direction of the portion 19a and both the edges in the Z-axis direction of the portion 19c in the cam groove 18 the protrusions are to be formed at may be determined according to a possible external force to act on a camera and a collapsible lens barrel mounted thereon.

Although the demating prevention grooves 36a, 36b and 36c have been provided on the side of the imaging element 14 with respect to the cam grooves 18a, 18b and 18c in the embodiment described above, a similar effect can be obtained even when the positions of these grooves are reversed.

Although the first group frame 2 provided with the first group lens L1 and the first group moving frame 3 have been different members in the embodiment described above, they also may be formed as one piece to which the guide poles 4a and 4b may be fixed.

Although the third group lens L3 has been movable in a direction perpendicular to the optical axis using the image blurring correcting device 31, even a general lens barrel in which the third group lens L3 is fixed to the third group frame 8 and no image blurring correcting device is mounted can achieve a similar effect.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

INDUSTRIAL APPLICABILITY

Although the field to which the present invention is to be applied is not particularly limited, the present invention can be applied to, for example, a collapsible lens barrel whose lens aperture is relatively large and that is heavy and ready for a high zooming factor.

The invention claimed is:

1. A collapsible lens barrel whose lens group is advanced when an image is captured, the collapsible lens barrel comprising:
   a driving frame for driving the lens group, comprising a cam pin and a demating prevention pin;
   a cam frame comprising a cam groove and a demating prevention groove that mate with the cam pin and the demating prevention pin, respectively; and
   a first protrusion provided on at least one side in an optical axis direction of a portion of the demating prevention groove with which the demating prevention pin mates when the driving frame is advanced;
   wherein, in a state where the lens group has been advance, the demating prevention pin contacts the first protrusion to prevent the cam pin from demating from the cam groove.

2. A collapsible lens barrel whose lens group is advanced when an image is captured and whose lens group is retracted when the image is not captured, the collapsible lens barrel comprising:
   a driving frame for driving the lens group, comprising a earn pin and a demating prevention pin;
   a cam frame comprising a cam groove and a demating prevention groove that mate with the cam pin and the demating prevention pin, respectively;
   a first protrusion provided on at least one side in an optical axis direction of a portion of the demating prevention groove with which the demating prevention pin mates when the driving frame is advanced; and
   a second protrusion provided on at least one side in the optical axis direction of a portion of the demating prevention groove with which the demating prevention pin mates when the driving frame is retracted;
   wherein, in a state where the lens group has been advanced, the demating prevention pin contacts the first protrusion to prevent the cam pin from demating from the cam groove, and
   in a state where the lens group has been refracted, the demating prevention pin contacts the second protrusion to prevent the cam pin from demating from the cam groove.

3. A collapsible lens barrel whose lens group is retracted when an image is not captured, the collapsible lens barrel comprising:
   a driving frame for driving the liens group, comprising a cant pin;
   a cam frame comprising a cam groove that mates with the cam pin; and
   a protrusion provided on at least an object side in an optical axis direction of a portion of the cam groove with which the cam pin mates when the driving frame is retracted;
   wherein, in a state where the lens group has been retracted, the cam pin contacts the protrusion to prevent the cam pin from demating from the cam groove.

4. A collapsible lens barrel whose lens group is entirely refracted in a camera main body when an image is not captured, the collapsible lens barrel comprising:
   a driving frame for driving the lens group, comprising a cam pin;
   a cam frame comprising a cam groove that mates with the earn pin; and
   a protrusion provided on at least an object side in an optical axis direction of a portion of the earn groove wit which the cam pin mates when the driving frame is retracted on a side of an imaging element with respect to a portion of the camera main body projecting farthest to the object side in the optical axis direction;
   wherein, in a state where the lens group has been entirely retracted in the camera main body, the cam pin contacts the protrusion to prevent the earn pin from demating from the earn groove.

* * * * *

UNITED STATES PATENT AND TRADEMARK OFFICE
CERTIFICATE OF CORRECTION

PATENT NO. : 7,463,824 B2
APPLICATION NO. : 10/550836
DATED : December 9, 2008
INVENTOR(S) : Naoto Yumiki et al.

It is certified that error appears in the above-identified patent and that said Letters Patent is hereby corrected as shown below:

Column 16, line 6 (claim 2): "earn pin and a demating prevention pin;" should read --cam pin and a demating prevention pin;--.

Column 16, line 22 (claim 2): "the lens group has been refracted, the" should read --the lens group has been retracted, the--.

Column 16, line 30 (claim 3): "cant pin;" should read --cam pin;--.

Column 16, line 45 (claim 4): "earn pin; and" should read --cam pin; and--.

Column 16, line 47 (claim 4): "a portion of the earn groove wit which" should read --a portion of the cam groove with which--.

Column 16, line 54 (claim 4): "the protursion to prevent the earn pin" should read --the protrusion to prevent the cam pin--.

Signed and Sealed this

Nineteenth Day of January, 2010

David J. Kappos
*Director of the United States Patent and Trademark Office*